No. 828,831. PATENTED AUG. 14, 1906.
C. J. VAN BUREN.
DITCHING MACHINE.
APPLICATION FILED DEC. 2, 1903. RENEWED JAN. 19, 1906.

7 SHEETS—SHEET 1.

Witnesses
J. F. Pattison
Fred W. Englert

Inventor
C. J. Van Buren.
by Wilkinson & Fisher.
Attorneys.

No. 828,831. PATENTED AUG. 14, 1906.
C. J. VAN BUREN.
DITCHING MACHINE.
APPLICATION FILED DEC. 2, 1903. RENEWED JAN. 19, 1906.

7 SHEETS—SHEET 2.

No. 828,831. PATENTED AUG. 14, 1906.
C. J. VAN BUREN.
DITCHING MACHINE.
APPLICATION FILED DEC. 2, 1903. RENEWED JAN. 19, 1906.

7 SHEETS—SHEET 3.

Witnesses
J. F. Pattison
Fred W. Englert

Inventor
C. J. Van Buren
By Wilkinson & Fisher

No. 828,831. PATENTED AUG. 14, 1906.
C. J. VAN BUREN.
DITCHING MACHINE.
APPLICATION FILED DEC. 2, 1903. RENEWED JAN. 19, 1906.
7 SHEETS—SHEET 4.
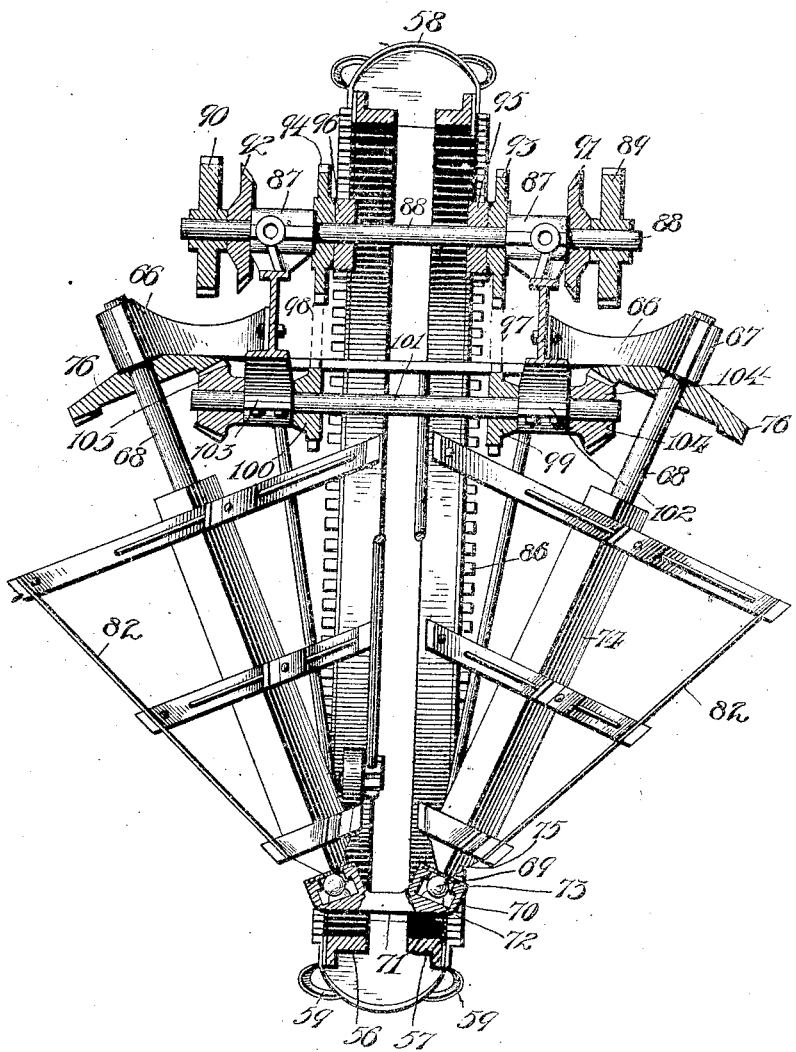

No. 828,831. PATENTED AUG. 14, 1906.
C. J. VAN BUREN.
DITCHING MACHINE.
APPLICATION FILED DEC. 2, 1903. RENEWED JAN. 19, 1906.
7 SHEETS—SHEET 5.
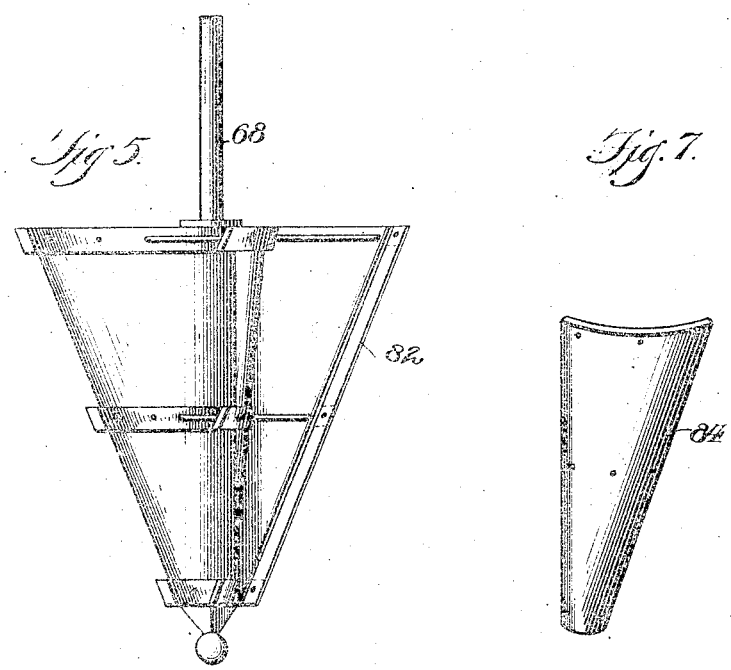
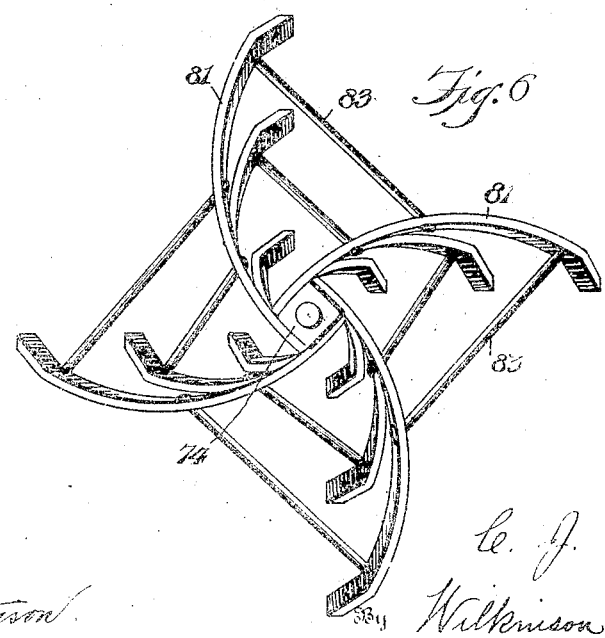

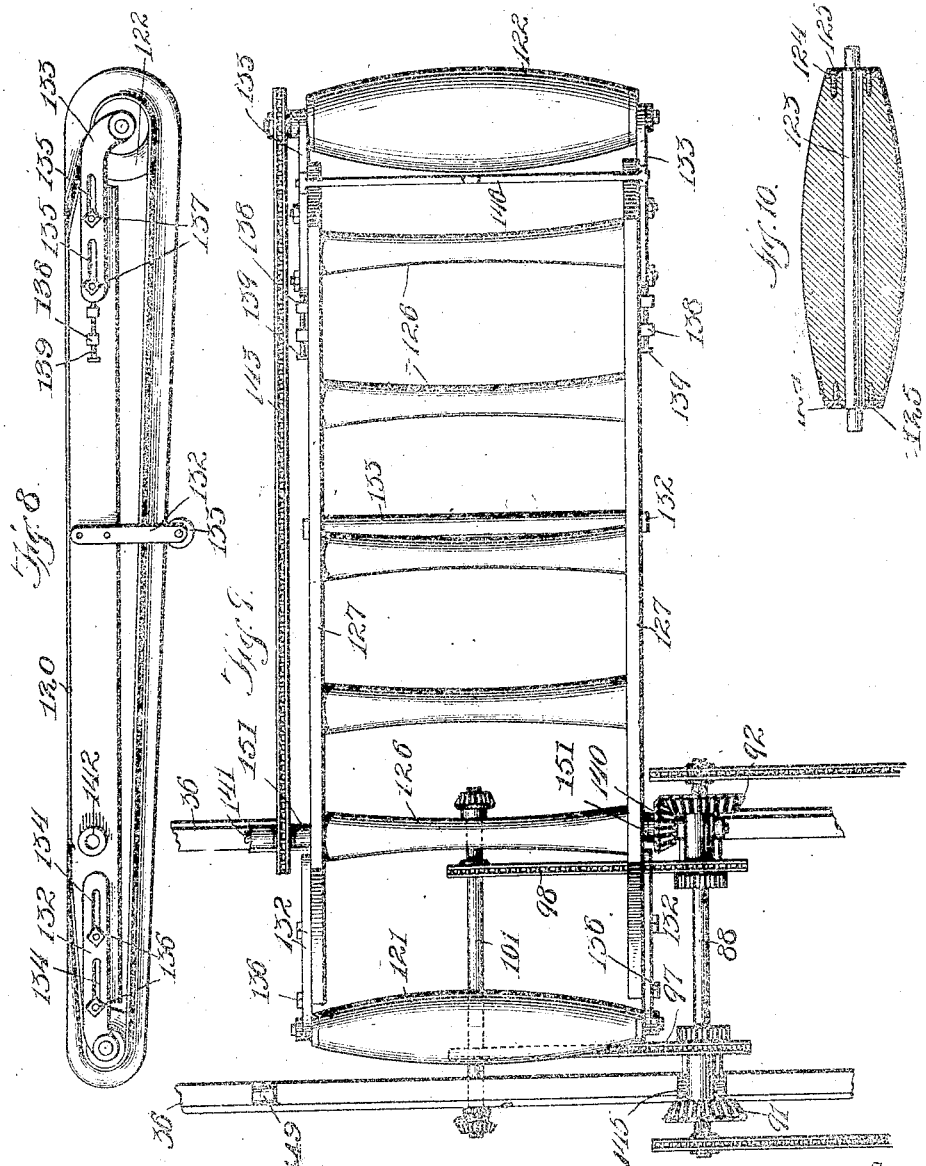

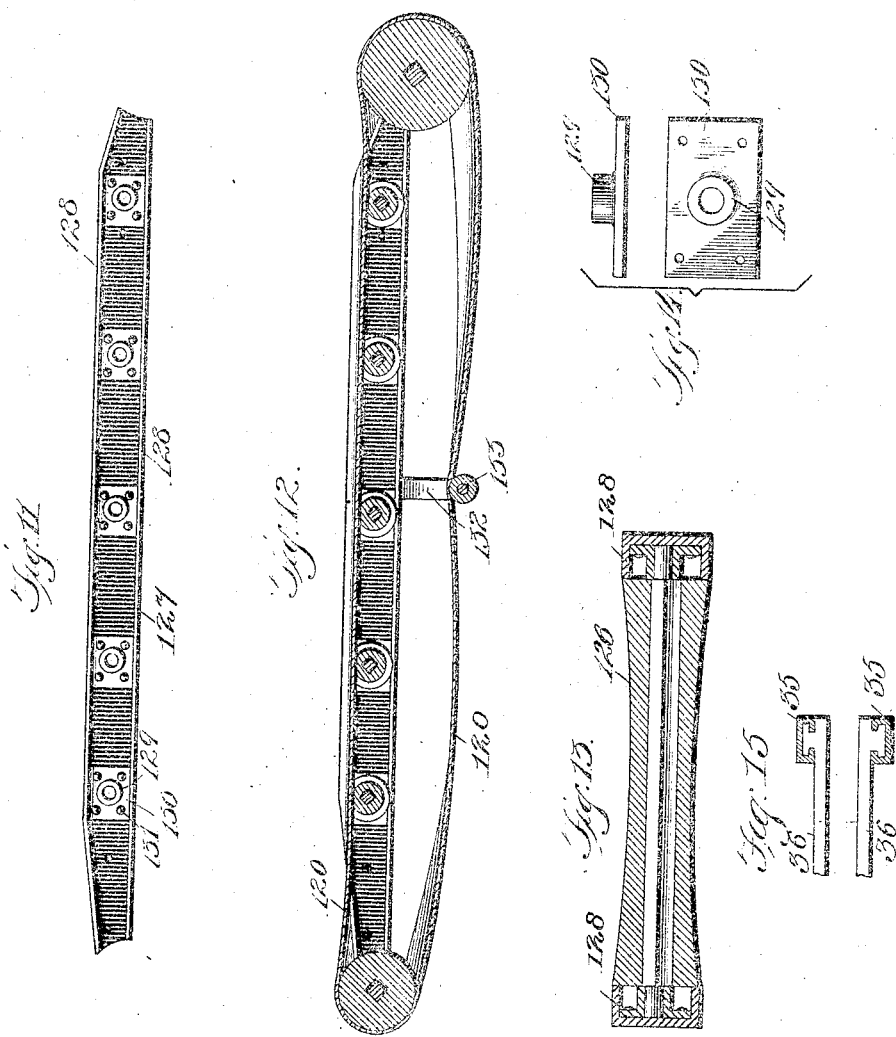

UNITED STATES PATENT OFFICE.

CHARLES JACKSON VAN BUREN, OF FINDLAY, OHIO, ASSIGNOR TO THE VAN BUREN, HECK & MARVIN CO., OF FINDLAY, OHIO.

DITCHING-MACHINE.

No. 828,831.        Specification of Letters Patent.        Patented Aug. 14, 1906.

Application filed December 2, 1903. Renewed January 19, 1906. Serial No. 296,825.

*To all whom it may concern:*

Be it known that I, CHARLES JACKSON VAN BUREN, a citizen of the United States, residing at Findlay, in the county of Hancock and State of Ohio, have invented certain new and useful Improvements in Ditching-Machines; and I do hereby declare the following to be a full, clear, and exact description of the invention, such as will enable others skilled in the art to which it appertains to make and use the same.

My invention relates to improvements in ditching-machines, and it is a specific improvement over the machine shown in Patent No. 523,790.

The object of my invention is to provide a compact and easily-operated ditching-machine for completing a continuous ditch with a perfect grade at the bottom for the reception of the ordinary drain-tiles.

Further objects of my invention are to provide means whereby the sides of the ditch may be made sloping, if desired, and whereby the machine may be conveniently moved from place to place, at the same time digging a ditch of any desired length or width.

With these objects in view my invention consists in the construction and combination of parts, as hereinafter described and claimed.

Figure 1:
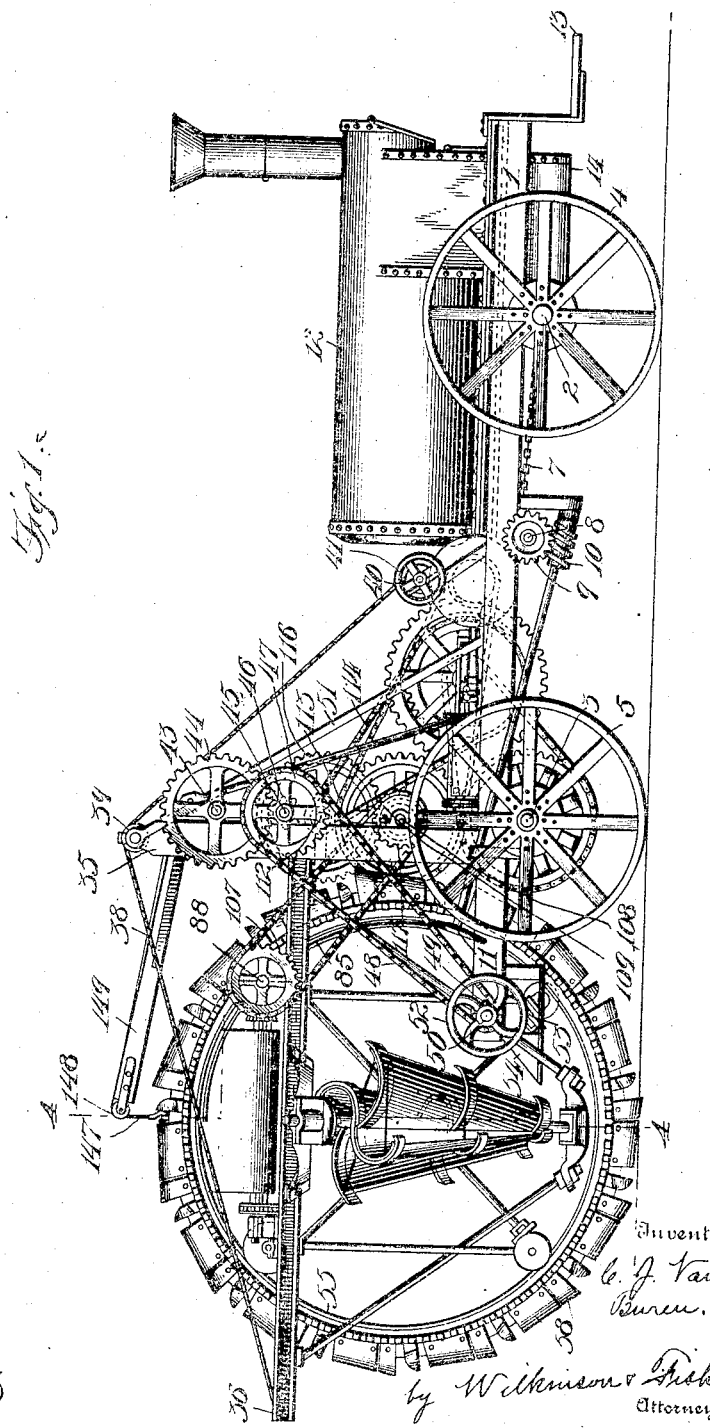
Figure 2:
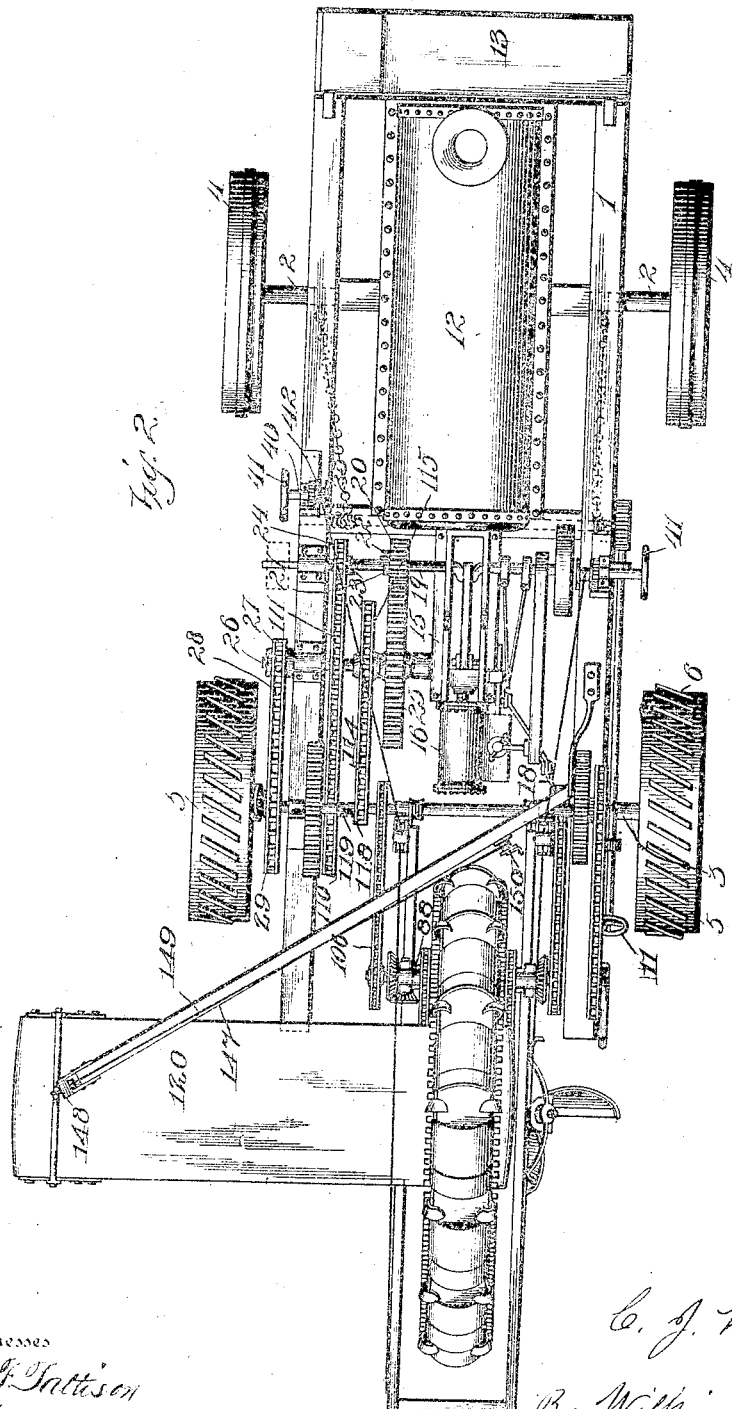
Figure 3:
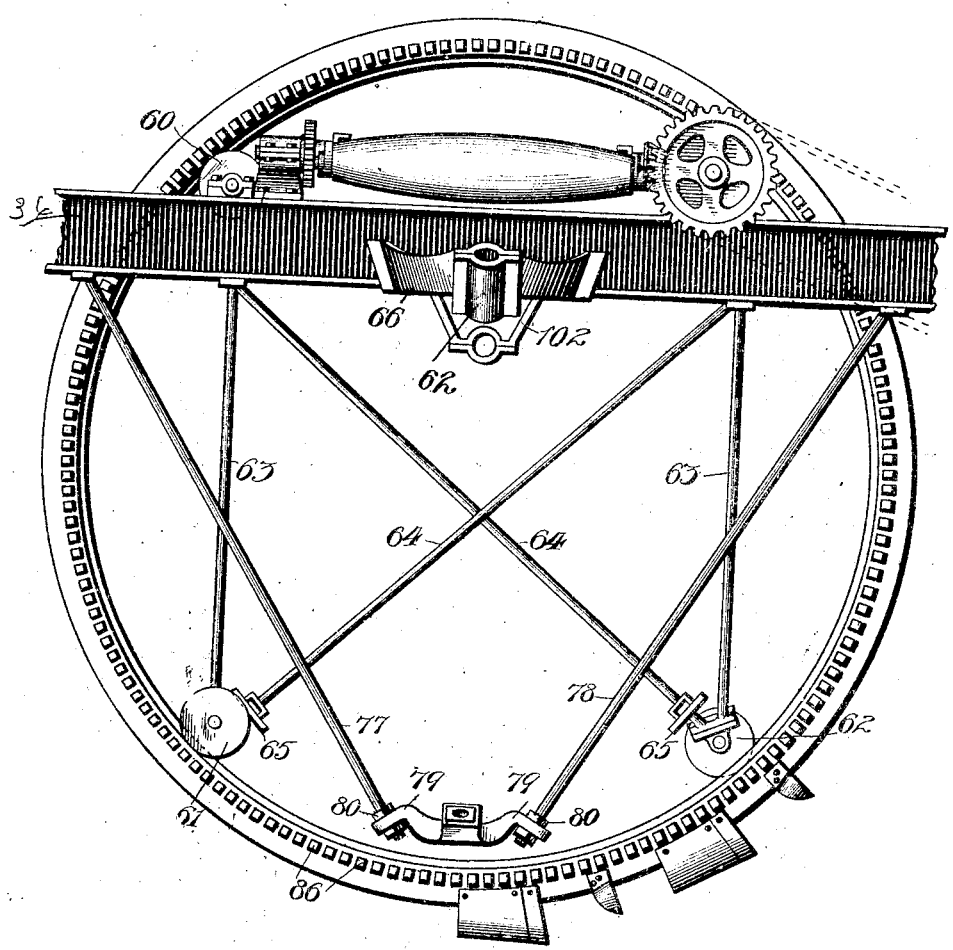

In the accompanying drawings, Figure 1 is a side view of my complete ditching-machine. Fig. 2 is a top plan view of the same. Fig. 3 is a side view of the operating-wheel and some of the related parts. Fig. 4 is a vertical cross-section of the ditching-wheel on the line 4 4 of Fig. 1. Fig. 5 is a perspective view of the conical side attachments to the ditching-wheel. Fig. 6 is a top view of the same with the plates removed. Fig. 7 is a perspective view of one of the plates. Fig. 8 is a side view of the conveyer-apron. Fig. 9 is a top plan view showing the means for operating the conveyer-apron and the supports therefor, the apron itself being removed. Fig. 10 is a cross-section of the end guiding-roller. Figs. 11, 12, 13, and 14 show details of the construction of the endless dirt carrier or conveyer. Fig. 15 is a top plan view showing details of the guiding-beams used in raising and lowering the ditching-wheel.

1 designates the engine-frame, which is supported on the front axle 2 and rear axle 3. The front axle 2 is pivotally connected to the frame near its front end, so that the machine may be steered in the proper direction. On the front axle 2 are mounted the wheels 4, and on the rear axle 3 are loosely mounted the wide traction-wheels 5, which are provided with calks 6 to prevent slipping.

To guide the machine, the front axle 2 has attached to it two chains 7, wound in opposite directions upon the axle 8. This axle carries at one end the worm-wheel 9, which engages the worm 10, which is operated by the hand-wheel 11, located near the rear of the machine. In front of the boiler 12 a platform 13 is built, and said boiler is provided with a suitable fire-box 14.

Behind the boiler 12 on the main frame 1 is supported a suitable intermediate bed-frame 15, on which is mounted an ordinary engine 16, which is supplied with steam from the boiler 12. A reversing-lever 18 is also provided, so that the machine may be moved back or forth as desired.

The piston of the engine is connected with the main driving-shaft 19, mounted in bearings in the frame 1 and the bed-frame 15. On the shaft 19 is slidably but otherwise fixedly mounted an adjustable pinion 20, provided on one side with a clutch-hub 21. This pinion may be held in any desired position upon the shaft 19 by the set-screw 22. The hub of the pinion 20 is adapted to be moved when desired into engagement with the corresponding clutch-hub 23, which projects from one side of a small sprocket-wheel 24, which is loosely mounted on the shaft 19.

When the machine is to be propelled from point to point, the parts are arranged, as shown in Fig. 2, with the pinion 20 engaging a large gear-wheel 25, which is mounted on a short counter-shaft 26. This shaft 26 is journaled in bearings on the frames 1 and 15, and said shaft carries upon its outer end outside the frame 1 a gear-wheel 27, over which passes a sprocket-chain 28, which chain also passes over the sprocket-wheel 29, mounted on the axle 3.

The operating parts propel the machine forward or backward, as desired, by means of the ratchet-and-dog connections shown in the patent to J. B. Hill, No. 523,790, dated July 31, 1894.

Near the rear end of the frame 1, attached thereto and projecting upwardly therefrom, are a pair of beams 35, each of which is provided with a slot on its inner face. Braces 51, connected to the top of these beams and to the sides of the main frame, respectively, serve to stiffen the structure. These upright beams support the inner ends of the horizontal I-beams 36. The outer ends of these I-beams are supported by ropes 38, which pass over pulleys 39, mounted on the top of the beams 35, and these ropes pass over shafts 40, mounted on extensions of the main frame 1, which shafts 40 may be turned by the hand-wheels 41 for the purpose of raising or lowering the outer ends of the I-beams 36. An ordinary pawl-and-ratchet device 42 is used to hold the shafts 40 in their adjusted position.

The two I-beams 36 are connected near their front and rear ends and form an open rectangular frame, in which is supported the main ditching-wheel by means hereinafter described. The inner ends of these I-beams are provided with extensions which slide in and are guided by slots on the inside of the beams 35. It is obvious that by rotating the shafts 40 the outer ends of the beams 36 may be raised or lowered, and the inner beams are raised and lowered by a similar means, which will now be described.

On the front of the beams 35, and near the tops thereof, is journaled a shaft 43, which is provided with two pulleys just inside of the beams 35, and to these pulleys are attached ropes, the other ends of which are attached to the beams 36.

On the shaft 43 is mounted a large gear-wheel 44, which meshes with a small gear-wheel 46, mounted on a stub-shaft 45, which is attached to the front of one of the beams 35. The shaft 45 carries a gear-wheel 47, over which passes a sprocket-chain 48. This chain 48 also passes over a pinion 49, mounted on a stub-shaft 50, attached to one of the sides of the frame 1. A hand-wheel 52 is mounted on this shaft and serves for the purpose of moving the pinion 49, and thereby adjusting the inner ends of the beams 36 up or down, as may be desired.

A pawl-and-ratchet device (not shown) is used on the shaft 50 to hold it in any desired position. A platform 53 is attached by braces 54 to one of the sides of the frame 1 near the wheel 52, so that the operator may stand thereon to operate the wheels 52 and 11 and also the reversing-lever 18.

Between the I-beams 36 is supported the excavating-wheel 55, which is annular in shape and which revolves between the I-beams 36, by which it is supported. This wheel consists of two parallel rims 56 and 57, which are spaced apart from each other and held in their proper relation to each other by means of braces and also by the buckets 58. These buckets are shown as made in two parts, a front cutting part and a rear carrying part, which rear part is of course provided with a back plate. These buckets are located around the entire circumference of the excavating-wheel. In front of each bucket, which is curved, as shown, are two cutters 59, which project out beyond the buckets and over the gear-teeth carried by the rims 56 and 57, so that said gear-teeth will not become clogged by the dirt in the sides of the ditch. These also serve to loosen the dirt, so that it may be easily scooped up by the buckets.

The rims 56 and 57 serve as a track for the reception of the guiding-rollers 60, 61, and 62. A fourth guiding-roller similar to the guiding-roller 60 is used, but is not shown on the drawings, as it is located behind one of the operating gear-wheels. The roller 60 and its companion (not shown) are supported in bearings upon the beams 36. The rollers 61 and 62 are each supported on a triangular frame composed of two bars 63 and 64, fastened to the beam 36. These bars are united at their lower ends into bearings for the pulleys carried thereby.

Adjusting means 65 is provided on each of the bars 64 to aid in assembling the parts and which may be moved to compensate for wear. The ends of the rods 64 are screw-threaded, engaging in projections on the part 65.

There is of course one set of four rollers for each of the rims 56 and 57, and it is obvious that more guide-rollers may be used, if desired; but I have found that four is sufficient.

To each of the beams 36 is attached a projecting bracket 66, the outer end of which is provided with a bearing 67. This bearing is for the reception of the shaft 68 of one of the side cutters. The lower end of this shaft is mounted upon a ball 69, located in the bearing 70, the bearings 70 being connected together by the arm 71. The ball 69 is supported in a cup 72, and a perforated plate 73 is provided to prevent dirt from entering said bearing. To each of the shafts 68 is fastened a polygonal portion 74, which terminates in a tapered portion 75, which is adapted to project through the part 73 and rest upon the ball 69. The shaft is rotated by a gear-wheel 76, which is splined thereto, and a set-screw (not shown) may be used to secure said gear-wheel upon said shaft.

From the construction described it is obvious that the shaft 68 and the parts attached thereto may be easily removed from the machine, which is done in case it is desired to make a ditch with straight sides instead of with sloping sides. The bearings 70 are each supported by two rods 77 and 78, fastened to the beams 36. The lower end of each of the bearings 70 is expanded out, as shown in Fig. 3, forming ears 79, through which pass the ends of the rods 77 and 78. Adjusting-nuts 80 are used to hold the bearing in position upon the rods 77 and 78.

The side cutters are shown in detail in Figs. 5, 6, and 7. On the rectangular part 74 are mounted a series of four spirally-arranged arms 81, although, of course, any number may be used that is desired. The outer end of each of these arms 81 is bent forward and terminates in a sharp edge. Braces 83 serve to secure the arms 81 together. In the drawings I have shown three sets of these arms, the larger set being at the top; but it is obvious that any number of sets might be used. Curved plates or scoops 84 are attached to the sets of arms 81 just behind the knives 82, which are fastened to the outer ends of the arms 81.

It is obvious that by the arrangement shown, with the conical cutters and scoops, a ditch will be cut having sloping sides, which is advantageous in case the dirt is of such a character that it is liable to cave in.

Each of the buckets 58 is open on the side next to the rims of the wheel, and to prevent the dirt carried by the buckets from being spilled into the interior of the wheel before the proper time a curved stationary guard 85 is provided, which is supported on the I-beams 36.

Each of the wheel-rims 56 and 57 is provided on the outer side with an annular plate carrying gear-teeth 86, forming a rack. This plate is preferably made in curved sections, which are bolted onto the wheel-rims.

In the bearings 87, secured to the I-beams 36, is mounted a shaft 88, which drives the ditching-wheel. This shaft 88 is driven by means of sprocket-chains passing over the sprocket-wheels 89 and 90. The shaft 88 is also provided with gear-wheels 91 and 92 for driving the dirt-carrier, with sprocket-wheels 93 and 94 for driving the cutter-shafts 68 and with gear-wheels 95 and 96, which mesh with the teeth 86 on the rims 56 and 57. These gear-wheels 91 and 92 may be fitted with ratchets, so that in backing the excavating-wheel or main ditching-wheel to loosen or remove some obstruction the dirt-carrier will remain stationary. 97 and 98 represent sprocket-chains running from the sprocket-wheels 93 and 94 to sprocket-wheels 99 and 100, located on the shaft 101, which is mounted in bearings 102 and 103, secured to the I-beams 36. Fastened to the shaft 102 are bevel gear-wheels 104 and 105, which mesh with the gear-wheels 76 on the shafts 68. Thus it is obvious that the rotation of the shaft 88 will cause the rotation of the ditching-wheel, the movement of the dirt-carrier, and the movement of the side cutters.

Motion is imparted to the shaft 88 as follows: A sprocket-chain 106 passes over the sprocket-wheel 90, and a similar chain 107 passes over the sprocket-wheel 89. These sprocket-chains pass over gear-wheels on the shaft 108, one of these gear-wheels being shown at 109 in Fig. 1. The shaft 108 is located in bearings fastened to the front of the beams 35. This shaft carries the large sprocket-wheel 110, which by means of the sprocket-chain 111 is connected to the sprocket-wheel 24 on the shaft 19, which shaft is directly operated by the piston of the engine, when by means of the clutch-hubs 21 and 22 the sprocket-wheel 24 is operated. It is obvious that motion will be transmitted through the chain 111 and the sprocket-wheel 110 to the shaft 108, which in turn, by means of the sprocket-chains 106 and 107, operates the shaft 88, thereby operating the ditching-wheel, the dirt-carrying apron, and the side cutters. When thus geared up, the engine will drive the ditching-wheel when the machine is stationary. Usually, however, it is desirable to move the machine forward while the ditching-wheel is running, and for this purpose I employ another gear-shaft 112, which is secured in bearings on the front of the beams 35. This shaft carries a sprocket-wheel 113, over which passes a sprocket-chain 114, which sprocket-chain also passes over a gear-wheel 115 on the shaft 26, this shaft being provided with a gear-wheel 25, meshing with the pinion 20, as already described.

The shaft 112 is provided with a large gear-wheel 116, which meshes with a small gear-wheel on the shaft 108, so that the shafts 108 and 112 are always in constant communication. The sprocket-wheel 113 is loosely mounted upon the shaft 112, and is provided with a clutch-hub 118. A similar slidable clutch-hub 119 is also provided on the shaft 112, to which it is splined. This clutch-hub may be moved into engagement with the clutch-hub 118 by hand or by an ordinary shifting-lever. When these two clutch-hubs are in engagement with each other, the movement of the shaft 108 will also cause the movement of the shaft 26 and drive the whole machine forward.

When the parts are adjusted as shown in Fig. 2 and the engine is started, the machine will move forward without operating the ditching-wheel. As soon as the clutch-hubs 118 and 119 are brought into engagement the ditching-wheel will begin to operate, while the machine is at the same time moved forward. If for any reason it is desired to operate the ditching-wheel without moving the machine forward, the pinion 20 is moved along the shaft 19 until the clutch-hubs 21 and 23 are in engagement with each other, when, as before described, the movement of the engine will operate the ditching-wheel. If while the ditching-wheel is operated the hubs 118 and 119 are moved into engagement, the machine will at the same time be moved forward, while the ditching-wheel still continues its operation.

As the dirt is brought up by the buckets it is discharged upon the endless conveyer 120, by which it is carried out and dumped on the bank at the side of the ditch. This conveyer is a wide belt composed of canvas or other suitable material. This belt is supported on a frame provided with end rollers 121 and 122, which rollers are of the shape shown in Figs. 9 and 10—that is to say, elliptical in outline—and the outer roller 122 is about twice the size of the inner roller 121. These rollers are made of wood or any suitable material, and each is carried upon a shaft provided with a polygonal central portion 123, and caps 124 are secured at the ends by screws 125 or other suitable means.

It may sometimes be found necessary in some conditions of soils to provide scrapers for the end rollers 122 and 121 to prevent the accumulation of sticky earth on said rollers. It may also be advantageous to substitute sprocket-wheels for the rollers 122 121, two on each shaft, and with a plain pulley or roller of from two to three inch face in the center of the shaft and between the sprocket-wheels before mentioned. In this case two sprocket-chains will be used, one on each side of the apron or conveyer-belt 120, this belt being over the sprocket-chains and attached thereto by means of attachment-links.

Intermediate of the end rollers the conveyer passes over a series of concave rollers 126, the result being that the conveyer as it passes over the rollers 126 will assume a form lowest in the center, thereby preventing the dirt from spilling off; but when said conveyer passes over the end rollers 122 the dirt will of course be thrown off toward both ends of said roller.

The conveyer is carried on a supporting-frame composed of side bars 127, each of which bars on the inside is provided with ridges 128, between which ridges the rollers 126 are mounted, as shown in Fig. 11. Each of the rollers 126 is carried in a cylindrical bearing 129 at each end, which bearing is made integral with the rectangular plate 130, attached to the side bar 127 by bolts or screws 131. Underneath the frame downwardly project two arms 132, which carry a transverse idler-roller 133 for supporting the lower side of the conveyer-apron. On the ends of the bars 127 are carried the curved arms 132 and 133, in the ends of which the rollers 121 and 122, respectively, are mounted. Each of these arms is provided with a plurality of slots 134 and 135, through which loosely pass bolts 136 and 137, upon which said arms may slide for the purpose of tightening or loosening the conveyer-apron.

Each of the bars 127 is provided with a projection 138, through which passes an adjusting-screw 139, connected to one of the arms 133. A similar construction for adjusting each of the inner arms 132 may be used, if desired.

The conveyer-apron is driven, as shown in Fig. 9, from the beveled gear-wheel 92, which meshes with a similar beveled gear-wheel 140, which is mounted on a shaft 141, passing through bearings 142 in the side bars 127 and through bearings 151, mounted on the upper face of one of the I-beams 36. The shaft 141 is provided with a sprocket-wheel, and a sprocket-chain 143 passes over this wheel and a similar wheel mounted on one end of the shaft carrying the roller 122. It is obvious, therefore, that the rotation of the shaft 88, which carries the gear-wheel 92, will through the means just described rotate the roller 122 and move the conveyer-apron.

It often happens that it is desirable to discharge the dirt on more than one side of the ditch, and for this purpose the conveyer-apron is mounted so that it can be shifted upon either side of the machine. To do this, the shaft 141 is slipped out of its bearings, which therefore frees the conveyer-apron structure from the machine. The conveyer-apron is then carried around to the other side of the machine and the shaft 141 is passed through a bearing 144 on one of the beams 36 through the bearings 142. The gear-wheel 140 is then slipped on the shaft and the shaft passed through a bearing 145 in proximity to the beveled gear-wheel 91, with which the beveled gear-wheel 140 will then engage.

The operation of the conveyer when shifted is similar to that already described, the dirt being discharged on the other side of the ditch.

To the outer end of the conveyer-frame is secured a bail 146, and this outer end is adjustably supported by means of a rope or wire 147, which engages said bail 146. The rope or wire 147 passes over a pulley 148, carried on the end of a projecting bar 149, which is attached to one of the beams 35. The rope or wire 147 runs over the shaft of an adjusting-wheel 150, Fig. 2, which is provided with a hand-wheel and pawl for winding or unwinding said rope and securing it in any desired position. The winding or unwinding of the rope 147 will of course raise or lower the outer end of the conveyer structure around the shaft 141 as a pivot.

While I have thus described my invention, I wish it to be distinctly understood that I do not limit myself to the exact details shown and described, as these might be varied considerably without departing from the spirit of my invention; but

What I claim as new, and desire to secure by Letters Patent, is—

1. In a ditching-machine, the combination of a supporting-frame, an open-center ditching-wheel, a dirt-conveyer, one end of which extends into the open center of said ditching-wheel, a driving-shaft for said conveyer, said conveyer being pivoted upon said shaft, means for adjusting the outer end of said conveyer up or down and means whereby said conveyer may be shifted from one side of said wheel to the other, substantially as described.

2. In a ditching-machine, the combination of a supporting-frame, a frame adjustably mounted in said supporting-frame, an open-center ditching-wheel mounted in said adjustable frame, a dirt-conveyer also supported by said adjustable frame and extending into the center of said wheel, a driving-shaft for said conveyer, which shaft also acts as a pivot for said conveyer, means for adjusting the outer end of said conveyer, means whereby said conveyer may be shifted from one side of said wheel to the other and means for driving said ditching-wheel and said conveyer, substantially as described.

3. In a ditching-machine, the combination of a supporting-frame, a second frame adjustably mounted on said supporting-frame, and including two parallel arms, an open-center ditching-wheel carried by said adjustable frame, duplicate sets of bearings mounted on said parallel arms, a shaft passing through one set of said bearings, and a dirt-conveyer pivoted on said shaft and extending into the open center of said wheel, whereby said conveyer may be shifted from one side of said wheel to the other side thereof, and means for adjusting the outer end of said conveyer, substantially as described.

4. In a ditching-machine, the combination of an open-center ditching-wheel, supports therefor, and side cutters carried by said supports, whereby the ditch is cut wider at its sides than the width of said ditching-wheel, substantially as described.

5. In a ditching-machine, the combination of an open-center ditching-wheel, an adjustable support therefor, conical cutters also carried on said support, and means for driving said ditching-wheel and said cutters, whereby a ditch with sloping sides is produced by the operation of the machine, substantially described.

6. In a ditching-machine, the combination of an open-center ditching-wheel provided with curved buckets, an adjustable support therefor, conical cutters carried by said support, and means for revolving said ditching-wheel and driving said cutters, whereby a ditch with a rounded bottom and sloping sides is produced, substantially as described.

7. In a ditching-machine, the combination of an open-center ditching-wheel, an adjustable support therefor, conical cutters carried by said support, an endless conveyer projecting into the open center of said ditching-wheel, and means for revolving said ditching-wheel and driving said cutters and conveyer, whereby a ditch with sloping sides and rounded bottom is produced and the dirt carried away, substantially as described.

8. In a ditching-machine, the combination of an open-center ditching-wheel, an adjustable support therefor, said support including two parallel bars, duplicate bearings on said bars, a driving-shaft mounted on one set of said bearings, an endless conveyer mounted on said driving-shaft on which said conveyer is pivoted, means for adjusting the outer end of said conveyer upwardly and downwardly, said conveyer being capable of being shifted from one side of said ditching-wheel to the other side thereof, and conical cutters carried by said adjustable support, substantially as described.

9. In a ditching-machine, the combination of a supporting-frame provided with upright beams grooved on the inside, an open-center ditching-wheel, an adjustable supporting-frame therefor provided with projections adapted to engage in said grooves, said ditching-wheel being composed of two parallel rims united together by buckets, supporting-braces provided with pulleys carried on said adjustable frame, said pulleys engaging the inside of said rims, whereby said ditching-wheel is revolubly supported between the side bars of said adjustable frame, and separate side cutters also mounted on said adjustable frame, substantially as described.

10. In a ditching-machine, the combination of a main frame, an adjustable frame carried thereby, an open-center ditching-wheel supported by said frame, said ditching-wheel being composed of two parallel rims, buckets uniting said rims, wheel-cutters mounted just ahead of said buckets, conical side cutters also mounted on said adjustable frame, and means for driving said wheel and said conical cutters, substantially as described.

11. In a ditching-machine, the combination of a supporting-frame, an adjustable frame carried by said supporting-frame, an open-center ditching-wheel carried by said supporting-frame, means for adjusting said adjustable frame up and down, conical side cutters also carried by said adjustable frame, and a dirt-conveyer carried by said adjustable frame, said dirt-conveyer being capable of being shifted from one side of said wheel to the other, substantially as described.

12. In a ditching-machine, the combination of a ditching-wheel, an adjustable supporting-frame therefor, and means for adjusting said frame, said frame being rectangular in its general outline and provided with bearings for supporting the means for driving said wheel, bearings for the reception of a pivot for a conveyer, outwardly-extending brackets for the support of side cutters and downwardly-extending brackets provided with bearings for the support of means for driving the said side cutters, substantially as described.

13. In a ditching-machine, an adjustable frame for the support of the ditching-wheel, side cutters, and conveyer, said frame being rectangular in its general outline and composed of two I-beams forming the sides thereof, said I-beams being provided at one end with projections, connections between said I-beams near their ends, duplicate sets of bearings mounted on said I-beams for the reception of the pivot for the conveyer, an outwardly-extending bracket on each of said I-beams for the reception of the side cutters and a downwardly-extending bracket provided with a bearing on each of said I-beams for the reception of driving means for said cutters, substantially as described.

14. In a ditching-machine, an adjustable frame for supporting the ditching-wheel, dirt-conveyer, and side cutters, said frame being rectangular in outline and being composed of two side I-beams united together, said I-beams being each provided at one end with a projection, two bearings mounted on top of each I-beam for the reception of a pivot for the dirt-conveyer, side brackets, one attached to each I-beam for the reception of the upper end of the cutters, downwardly-extending brackets, each provided with a bearing attached to said I-beams respectively, downwardly-extending braces attached to each of said I-beams, a common support attached to each of said braces, bearings in said common support for the reception of the lower ends of the cutters, and braces attached to said I-beams carrying pulleys for the support of the ditching-wheel, substantially as described.

15. In a ditching-machine, the combination of a main frame, a supporting-frame for the ditching-wheel adjustably mounted on said main frame, said adjustable frame being provided with means for supporting the ditching-wheel, the dirt-conveyer, and the side cutters, a conveyer pivotally mounted on said adjustable frame, conical cutters mounted on said supporting-frame, an open-center ditching-wheel mounted on said frame, means for driving said ditching-wheel, and suitable connections whereby said driving means also operates said conveyer and said conical cutters, substantially as described.

16. In a ditching-machine, the combination of an open-center ditching-wheel, an adjustable frame supporting the same, a conveyer pivotally mounted on said supporting-frame, conical cutters also mounted on said supporting-frame, means for driving said ditching-wheel, and connections whereby said means also drives said conveyer and said cutters, means for operating said ditching-wheel, means for moving said machine forward, and adjustable connections whereby said ditching-wheel may be operated and the machine moved forward together, or whereby either may be operated separately, substantially as described.

17. In a ditching-machine, a side cutter therefor, including a central shaft, sets of bent arms of varying length secured to said shaft, and knives mounted on the ends of said arms, substantially as described.

18. In a ditching-machine, a side cutter therefor, consisting of a central shaft, a rectangular portion mounted on said shaft, sets of bent arms of varying length secured to said rectangular portion, braces between the arms of each set, cutting-knives mounted on the ends of said arms, and curved scoops carried by said arms, substantially as described.

In testimony whereof I affix my signature in presence of two witnesses.

CHARLES JACKSON VAN BUREN.

Witnesses:
JNO. SHERIDAN,
W. M. VAN BUREN.